Jan. 4, 1938.  A. ARUTUNOFF  2,104,339
GAS SEPARATOR FOR PUMPS
Filed Aug. 7, 1933  2 Sheets-Sheet 1
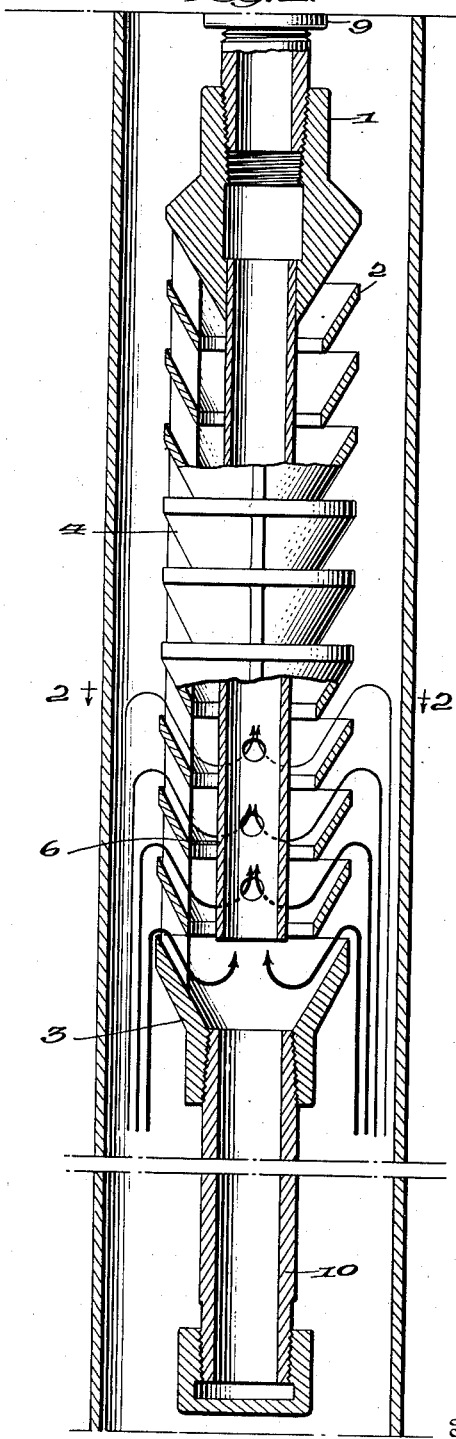
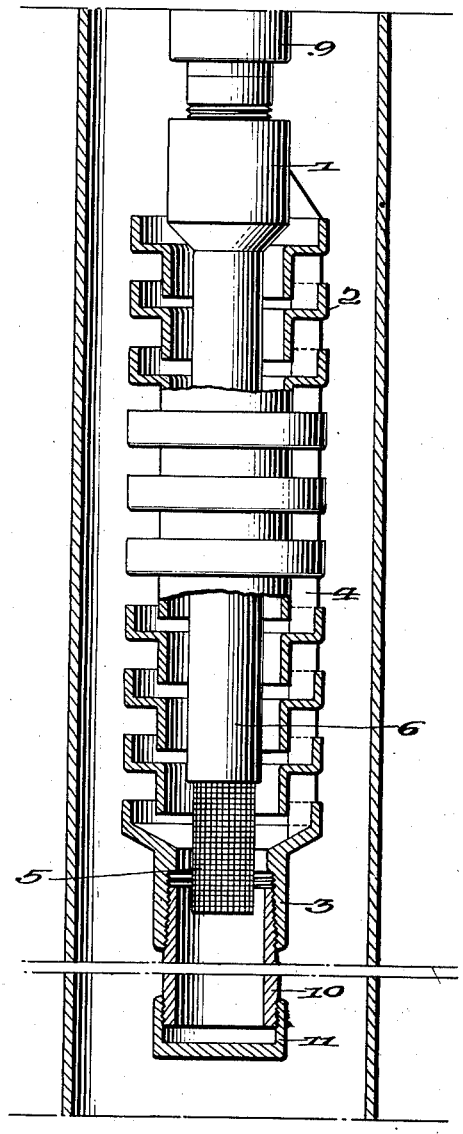
Inventor
Armais Arutunoff,
By
Attorneys Jan. 4, 1938.   A. ARUTUNOFF   2,104,339
GAS SEPARATOR FOR PUMPS
Filed Aug. 7, 1933   2 Sheets-Sheet 2

Inventor
Armais Arutunoff,
By
Attorneys

Patented Jan. 4, 1938

2,104,339

UNITED STATES PATENT OFFICE 2,104,339

GAS SEPARATOR FOR PUMPS

Armais Arutunoff, Bartlesville, Okla.

Application August 7, 1933, Serial No. 683,967

2 Claims. (Cl. 183—2.7)

This invention relates to improvements in a gas separator for use in oil well pumps.

The pumping of oil wells is handicapped by gas even if the pump is installed close to the bottom of the well and the liquid stands high above the pump, and the well produces no gas when standing idle, the well starts producing gas as soon as pumping begins. As pumping lowers the column of fluid standing in the well, it lowers the pressure existing at the bottom of the well. Under decreased pressure, gas which is suspended in the liquid liberates itself in the form of free gas. The capacity of the pump is impaired to the extent of the volume of gas entering the pump. If at certain decreased pressures the volume of gas liberated at the pump intake is equal to one-half of the total volume of said pump intake then the capacity of the pump is only one-half of the normal capacity. Such a condition is commonly referred to as the pump working at 50% volumetric efficiency; i. e., 50% of its full capacity. As a matter of fact, the pump works at 100% capacity all of the time and the expression above is to be understood as a condition at which the pump handles 50% liquids and 50% gases by volume.

In order to produce fluid out of the well, it is imperative that the pressure inside of the well be less than the pressure in the stratum supplying the fluid. The maximum rate of production will be caused if the pressure in the well is reduced practically to nothing; i. e., the column of fluid lowered almost to the bottom of the well. However, liberation of gases interferes with the lowering of the column below a certain point. Even if the pump is of sufficient capacity to handle all of the fluid which the well will produce at its highest rate of production, in the wells with liquids containing large amounts of dissolved gas, such a pump succeeds in lowering the column only to a negligible degree. The majority of wells with high standing fluid level and large amounts of gas dissolved in liquid, at present, are pumped at the rate which is only a small fraction of what the wells would produce if not for reasons of gas interference. To get the full benefit of pumping equipment of any kind or type, it is necessary that only liquids find their way toward the pump. The liquid has to be directed toward the intake of the pump while gas has to be directed to the opening of the well, as gas, by virtue of its low specific gravity, rises and does not need any lifting equipment for delivery to the surface. Various devices have been designed to prevent gas from reaching the intake of the pump but owing to limitations of available space and rather to lack of knowledge in regard to physical phenomena to be handled, there has been very little success in this development. Separation of gas from liquid is accomplished on the principle of gravity. Liquid is moved downward towards the extension of the pump intake, while gas or gas bubbles do not follow the downward motion of the liquid. In order that such separation be effective, it is necessary that the downward motion of the liquid be of a very small velocity. In making a small velocity possible for a given capacity of the pump, it is necessary to use a very large area of passage or passages. According to my design, the preferable forms of which are shown on the drawings, the area of downward directing fluid passages may be of any magnitude irrespective of the diameter of the well. This purpose is accomplished by staging vertically a number of separating devices in such a way that all passages lead to the pump intake.

An object of this invention is to provide an efficient means for separating gas from liquids to be pumped.

Another object is to provide a self-contained separating device of small diameter and large capacity.

Still another object is to provide in a device of the type mentioned above, means for separating and segregating foreign matters endangering the pump.

With the above and other objects in view which will appear as the description proceeds, my invention consists of the novel features herein illustrated in the accompanying drawings and more particularly pointed out in the appended claims.

Referring to the drawings in which numerals of like character designate similar parts throughout the several views, Figure 1 is a longitudinal sectional view of one form of my multi-stage gas separator;

Figure 3 is another form of my multi-stage gas separator showing a screen attached to the extension of pump intake beside the settling reservoir for sand below.

Figure 2:
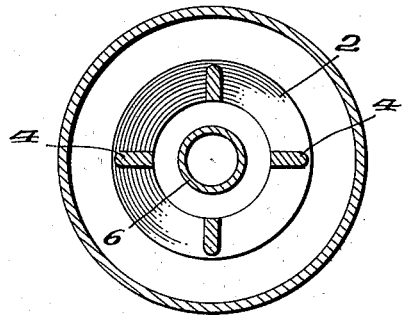
Figure 2 is another sectional view of the same separator at right angle to section indicated 2—2 (Fig. 1).

In the drawings 1 indicates the upper part of the gas separator by means of which it is connected to the pump intake;

2 is the separating unit of the gas separator.

3 is the lower part of the gas separator to which a sand trap may be attached if it does not form the integral part of it.

4 designates ribs which connect the individual members 2.

5 designates a gas screen which is normally attached at the end of the separator delivery tube 6.

8 indicates the intake opening when the design of sheet metal or of tubular goods is employed.

9 designates lower end of a pump.

10 designates the sand trap of the gas separator closed at the bottom with the cover 11.

Figure 5:
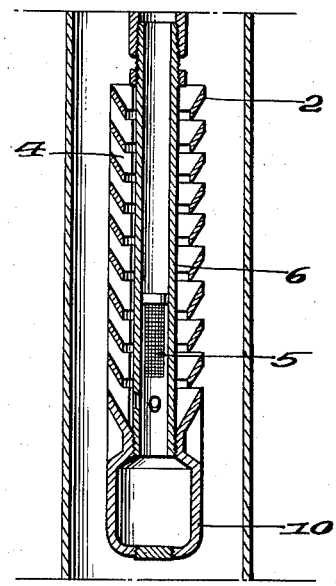
Figure 5 shows a modification when the device is made of separate parts assembled on the delivery tube.
Figure 4:
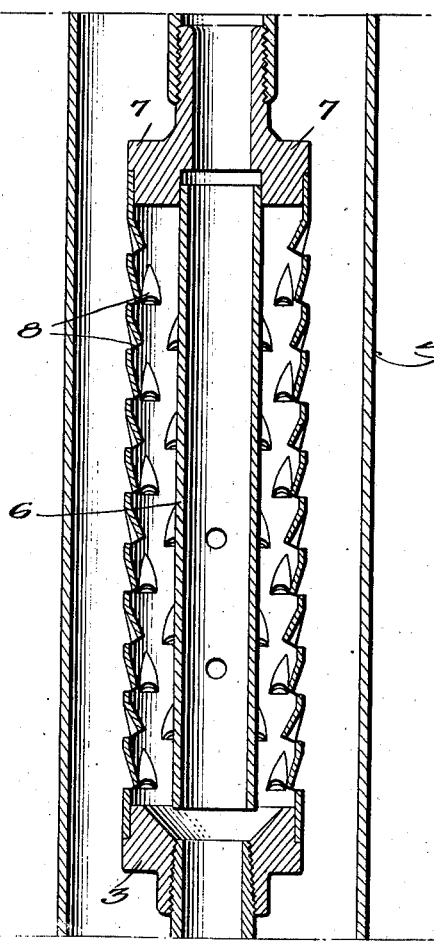
Figure 4 shows the embodiment of gas separator of my invention with the necessary modification in design when said separator is made of sheet metal or of tubular goods.

On Figures 1, 2, and 3, the device is shown as made of castings, however, it is obvious that the device lends itself and may be made out of stamped parts welded or fastened together on the delivery tube as shown on Figure 5.

In operation, the gas separator is attached with part 1 to the pump intake and is lowered into the well and under the fluid. When the pump starts, the fluid enters passages formed by partitions 2 and is compelled to move downward and towards the intake of the pump. The gas separation takes place immediately where the fluid flow is reversed; i. e., directed downward, while separation of foreign matter such as sand and the like takes place where direction of fluid is reversed again. The design employed allows any desired area of passages thus making it possible to keep the fluid downward velocity to such small magnitude that an efficient gas separation occurs at every opening on the cylindrical surface of the gas separator.

To understand the principle of this invention it must be realized that in order to have an efficient gas separation, the velocity of flow has to be sufficiently low so that there is a viscous and not a turbulent flow. Under the conditions of a viscous flow the resistance is in proportion to the length of the path traveled, and it is important to note that the length of said travel does not consist solely of the path inside of the separator, but includes the upward travel in the annular space between the separator and the well casing, the reverse travel in the separator proper and the upward travel in the separator.

Figure 6:
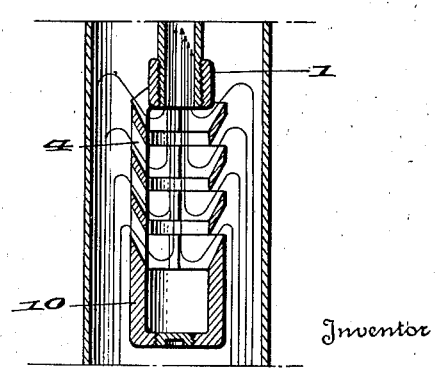
Figure 6 shows a simplified form of my multistage gas separator when no central intake tube is used.

In Figs. 1 and 6, I have shown with arrowheads and lines, the flow of the fluid in these two forms of my invention. Naturally all fluid comes from below the separator and in the case of the structure shown in Fig. 6, each particle of fluid travels the same distance and undergoes the same two changes in direction of travel. That is, starting with its initial upward travel between the well casing and the separator, it is first caused to reverse its flow downwardly between the separating elements 2 and then again reverses its direction of flow and passes upwardly through the pump intake. Granting that the cross section of the cylindrical passage A is equal to the cross section of the annular passage B between the casing and the outside diameter of the gas separator, the velocity of the flow will be equal in both passages A and B, and as the length of travel is also equal, each inclined passage 4 will receive its proportionate share of the total flow irrespective of the number of passages provided. This is clearly shown by the arrows in the drawings.

In order to counteract the effect of increased gas content of the liquid around the separator, it is desirable to retard the downward velocity of the flow as the gas content increases. This is accomplished as shown in Fig. 1 by providing the delivery tube 6 which extends downwardly from the pump and is arranged co-axial of the separating elements. Although this tube is preferably provided with perforations 12 spaced apart a predetermined distance, I do not intend to confine myself to such perforations, as they may, if desired, be eliminated.

The delivery tube is an incentive to a larger flow or higher velocity through the lower passages, and a smaller flow or lower velocity through the upper passages, which is required to accommodate gas loaded liquid all along the separator in an efficient manner as it is evident that by proper dimensioning of the length of the delivery tube 6, the annular space around the delivery tube, the perforations in the delivery tube and the annular space around the separator, any desired characteristic of the gas separator may be obtained.

From the foregoing, it is believed that my invention may be clearly understood, it being borne in mind that numerous changes in details of design may be made without departing from the spirit of my invention as set forth in the following claims.

I claim:

1. A multistage gas separator adapted for connection to the intake end of a well pump, including an outer member forming a series of superposed co-axial annular deflectors, the walls of which project downwardly and inwardly and terminate in open bottoms, rib means connecting said deflectors in vertically spaced relation so that the corresponding walls of adjacent deflectors form a series of unobstructed parallel downwardly and inwardly directed intake passageways of substantially uniform area throughout and open at their inner and outer extremities, means closing the bottom of the lowermost deflector, and an inner member comprising a delivery tube open at its lower end and adapted to be connected at its upper end to the intake of a pump, the lowermost of said deflectors defining an unobstructed inlet chamber, said tube extending downwardly through the central openings of said deflectors in spaced relation thereto and terminating at the top of said chamber.

2. A multistage gas separator as claimed in claim 1 wherein said delivery tube is provided with a series of vertically spaced intake openings, in line with certain of said passageways.

ARMAIS ARUTUNOFF.